United States Patent [19]

Hallock

[11] 4,213,373
[45] Jul. 22, 1980

[54] SHEET METAL NAIL WITH LOCKABLE LEGS

[76] Inventor: Robert L. Hallock, 7136 NE. 8th Dr., Boca Raton, Fla. 33431

[21] Appl. No.: 968,878

[22] Filed: Dec. 12, 1978

[51] Int. Cl.² .......................... E01B 9/12; F16B 15/04
[52] U.S. Cl. ............................................ 85/11; 85/31
[58] Field of Search .................. 85/11, 23, 24, 25, 26, 85/31, 79, 87, 88

[56] References Cited

U.S. PATENT DOCUMENTS

| 1,153,335 | 9/1915 | Pleister | 85/88 |
|---|---|---|---|
| 1,480,617 | 1/1924 | Hosnowski | 85/26 |
| 1,801,147 | 4/1931 | Flora | 85/88 |
| 2,362,969 | 11/1944 | Boelder | 85/79 |
| 2,550,060 | 4/1951 | Gisondi | 85/13 |
| 2,674,149 | 4/1954 | Benson | 85/31 X |
| 3,466,967 | 9/1969 | Hallock | 85/11 |
| 3,710,672 | 1/1973 | Hallock | 85/11 |
| 3,878,756 | 4/1975 | Hallock | 85/31 X |
| 4,031,802 | 6/1977 | Hallock | 85/11 |

FOREIGN PATENT DOCUMENTS

| 2155054 | 5/1973 | Fed. Rep. of Germany | 85/88 |
|---|---|---|---|
| 481367 | 9/1916 | France | 85/26 |

*Primary Examiner*—Thomas J. Holko
*Attorney, Agent, or Firm*—Dowell & Dowell

[57] ABSTRACT

A sheet metal nail of the type used to fasten a covering material to a lightweight base material in which a pair of interfitting generally U-shaped legs are connected to an enlarged head and such legs have means for spreading the legs apart when driven and means for locking the legs in spread apart condition.

2 Claims, 6 Drawing Figures

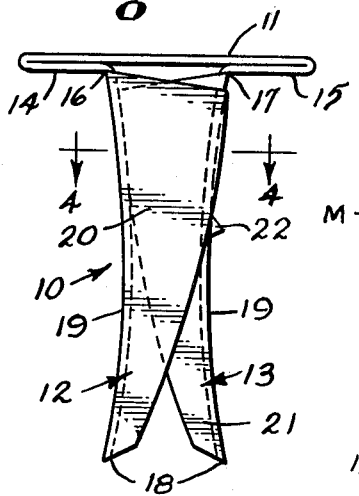
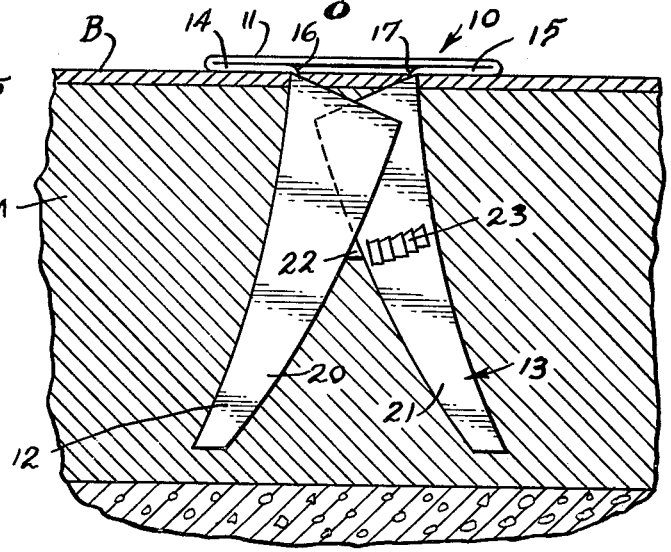
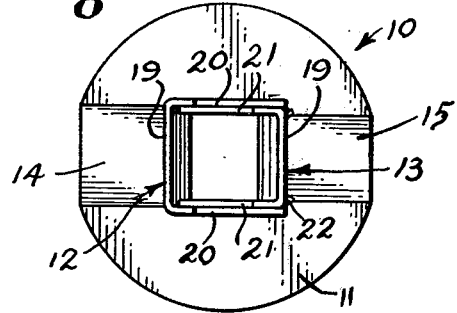
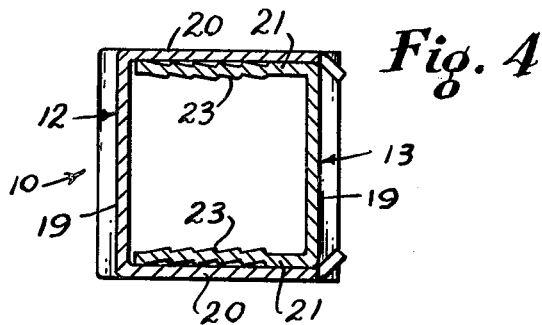
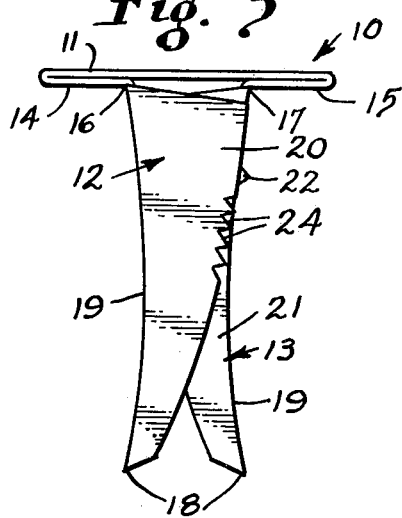
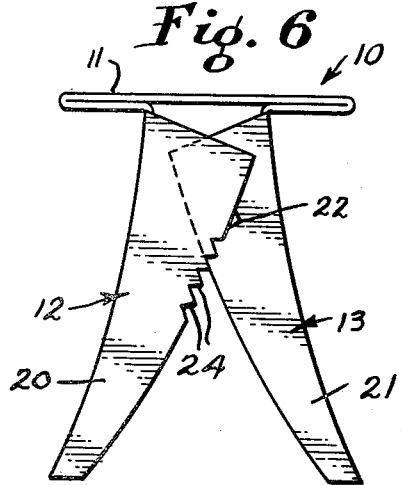

SHEET METAL NAIL WITH LOCKABLE LEGS

SUMMARY OF THE INVENTION

The present invention relates generally to nails and other fasteners and is embodied particularly in a sheet metal nail having a pair of interfitting generally U-shaped legs connected to an enlarged head in such a manner that at least one of the legs is movable relative to the other when the nail is driven into a lightweight material. The legs are formed in a manner such that the material into which the nail is driven causes the legs to spread apart from each other and means is provided for maintaining such legs in spread apart condition to resist withdrawal. In order to do this, at least one of the legs is provided with at least one projection which is bent toward the other leg and holds such legs in interfitting relationship until the nail is driven and thereafter engages a portion of the other leg to lock the legs in spread apart condition.

It is an object of the invention to provide a sheet metal nail having a pair of generally U-shaped legs forming a substantially hollow shank and having means for maintaining the legs in open condition after the penetrating portions of the legs have been spread apart from each other.

Another object of the invention is to provide a hollow sheet metal nail having interfitting generally U-shaped legs connected to an enlarged head and one of such legs is provided with means tending to maintain such legs in closed interfitting relationship with each other until driven and thereafter maintaining the legs in spread apart condition.

BRIEF DESCRIPTION OF THE DRAWING

FIG. 1 is a side elevation illustrating one embodiment of the invention in a closed position.

FIG. 2 is a side elevation illustrating the nail of the present invention after it has been driven.

FIG. 3 is a bottom plan view of FIG. 1.

FIG. 4 is an enlarged section taken on the line 4—4 of FIG. 1.

FIG. 5 is a side elevation similar to FIG. 1 showing another embodiment.

FIG. 6 is a side elevation illustrating the structure of FIG. 5 in open position.

DESCRIPTION OF THE PREFERRED EMBODIMENTS

With particular reference to the drawing, sheet metal nails for attaching a lightweight covering material such as felt, building paper and the like to a lightweight insulating material such as vermiculite, perlite, gypsum and the like including the commercially available product having the trade name Zonolite (produced by W. R. Grace & Co., Cambridge, Mass.) have been known before. Some of these nails are shown in Hallock U.S. Pat. Nos. 3,710,672; 3,812,817; and 4,031,802, as well as Wright U.S. Pat. No. 4,043,246. In each of these prior art patents a pair of hollow legs have been provided forming a shank for the nail and such legs have been provided with means for causing the legs to spread apart when driven into a lightweight base material in such a manner that the base material substantially fills the space defined between the deflected legs and prevents withdrawal of the nail. In order to do this, it was necessary that the legs be relatively long and that the sides of the U-shaped legs be relatively wide. Otherwise when a withdrawal force was applied to the head of the nail, such legs would tend to move toward each other along the same path in which they were forced outwardly while being driven.

In recent years the insulating R factor of styrofoam has been recognized and when combined with a lightweight base material such as Zonolite it has been found that the thickness of the Zonolite may be reduced to a thickness such that the prior art sheet metal nails have been too long.

In accordance with the present invention, a sheet metal nail 10 is provided having an enlarged head 11 to which a pair of generally U-shaped legs 12 and 13 are connected in any desired manner, as by connecting strips 14 and 15, respectively. Such strips normally are attached to the head in any conventional manner, as by welding, bent ears or the like (not shown). As illustrated in the drawing, the legs 12 and 13 are connected to the strips 14 and 15 adjacent to the head 11 by bendable hinge portions 16 and 17; however, it is contemplated that one of the legs could be rigidly connected to such head. Each of the legs has a penetrating portion 18 at the end remote from the head and normally the penetrating portions are spaced apart from each other a distance generally corresponding to the spacing of the legs at hinge portions 16 and 17 where the legs are connected to the head. This is done so that when the nail is driven the penetrating portions will cut a plug of material from the building paper B of a size which will be substantially completely filled by the leg portions adjacent to the head when the nail is entirely driven.

Each of the legs is generally U-shaped in cross-section with the leg 13 being slightly smaller than the leg 12 so that the leg 13 is received within the leg 12 prior to being driven.

The bight portion or back 19 of each of the legs 12 and 13 is arched inwardly intermediate the ends of the legs so that when the nail is driven into the base material M, such material engages the bight portion and causes the legs to bend outwardly about the hinge portions 16 and 17 to the position shown in FIG. 2. The sides 20 and 21 of the legs 12 and 13 preferably are relatively wide adjacent to the head 11 and the edges of such sides curve toward the bight portions 19 from the upper end toward the penetrating portions 18. Accordingly, the upper portions of the sides of the U-shaped legs are in overlapping interfitting relationship with each other adjacent to the head and are spaced from each other adjacent to the penetrating ends.

With particular reference to FIGS. 1 and 4, each of the sides of the outer leg 12 is provided with an outwardly extending finger 22 which is bent out of the plane of the side to a position behind the bight portion 19 of the leg 13. In this position the fingers 22 resist separation of the legs 12 and 13 until the nail has been driven.

Preferably the sides 21 of the leg 13 are provided with a series of finger engaging members such as notches or indentations 23 which are located substantially in alignment with the fingers 22 when the legs 12 and 13 are spread apart. Due to the flexibility of the sheet metal material, the fingers 22 slide over the notches 23 in a manner similar to a spring pawl to permit the legs to spread apart when being driven; however, the fingers engage the sides of the notches to resist closing movement of such legs.

With particular reference to FIG. 2, when the legs have spread apart so that the legs are at an included angle of approximately 20° to 30° and preferably at an angle of 25°, the finger 22 passes the sides 21 of the leg 13 and no longer frictionally engages such sides but instead the fingers spring inwardly to a position adjacent to the curved edge thereof. In this position the fingers form a mechanical lock and prevent the legs from closing. Since the legs are prevented from closing, the nail cannot be easily withdrawn due to the mass of material engaging the bight portions 19 of each of the legs.

With particular reference to FIGS. 5 and 6, another embodiment is provided in which the outer leg 13 is provided with a series of inwardly bent teeth 24 which frictionally engage the sides 21 of the leg 13 in addition to the finger 22. In this embodiment the notches 23 are omitted and the teeth 24 sequentially move off of the sides 21 when the legs 12 and 13 are spread apart and form a plurality of mechanical locks so that the legs 12 and 13 may spread apart varying amounts and at different angles. Due to the resilient nature of the sheet metal legs, the teeth 24 which have moved off of the sides 21 will meet less resistance than the teeth still engaging such sides and will lock the legs in spread apart condition.

When the combination of styrofoam and a lightweight base material such as Zonolite is being used, it has been found that a thickness of approximately 1½ inches (38.10 mm) of the base material has proved satisfactory in most cases. Accordingly, the length of the legs 12 and 13 may be approximately 1⅜ inches (34.925 mm) so that the legs do not penetrate entirely through the base material.

I claim:

1. A sheet metal nail for attaching covering material to a lightweight insulating base material comprising, an enlarged head, a shank connected at one end to said head, said shank including a pair of generally U-shaped legs each of which includes a pair of generally parallel sides connected by a bight portion, the sides of one of said legs being received within the other leg and defining a hollow enclosure before being driven, the other end of said shank being of substantially the same dimension as said one end and defining a penetrating portion, the bight portion of at least one of said legs being curved toward the other leg intermediate the ends for causing said leg to be deflected outwardly when the nail is driven into the base material, said curved bight portion causing said legs to spread apart to an included angle of approximately 25°, at least one of said legs having an outwardly extending projection which is bent toward the other leg to retain said legs in interfitting relationship with each other, and said projection forming a mechanical lock to hold said legs in spread apart condition, whereby withdrawal of said nail is substantially prevented when said legs are locked in spread apart condition.

2. The structure of claim 1 in which each of said legs has a length of approximately 1⅜ inches (34.925 mm).

* * * * *